United States Patent [19]

Miyoshi et al.

[11] Patent Number: 5,146,419
[45] Date of Patent: Sep. 8, 1992

[54] FLOATING POINT ADDITION-SUBTRACTION APPARATUS

[75] Inventors: Akira Miyoshi, Neyagawa; Takashi Taniguchi, Moriguchi, both of Japan

[73] Assignee: Matsushita Electric Industrial Co., Ltd., Osaka, Japan

[21] Appl. No.: 617,610

[22] Filed: Nov. 26, 1990

[30] Foreign Application Priority Data

Nov. 28, 1989 [JP] Japan .................. 1-308687

[51] Int. Cl.⁵ .............................................. G06F 7/38
[52] U.S. Cl. .................................................. 364/748
[58] Field of Search ........................ 364/748, 715.04

[56] References Cited

U.S. PATENT DOCUMENTS 4,999,800  3/1991  Birger ..................... 364/748
4,999,803  3/1991  Turrini et al. .......... 364/748

FOREIGN PATENT DOCUMENTS

1-205328  8/1989  Japan .
1-240927  9/1989  Japan .

Primary Examiner—Long T. Nguyen
Attorney, Agent, or Firm—Stevens, Davis, Miller & Mosher

[57] ABSTRACT

A floating point addition-subtraction apparatus for adding or subtracting data having a floating point format including a mantissa operand, an exponent operand, and a sign operand. The operands are shifted right or left depending on operational status.

4 Claims, 9 Drawing Sheets

NOR ... NORMALIZED NUMBER
DEN ... NON-NORMALIZED NUMBER
R ... RIGHT ONE-DIGIT SHIFT
L ... LEFT ONE-DIGIT SHIFT
N ... NON-SHIFT

| TYPE OF OPERATION (201) | INPUT OPERAND TYPE (202) | | SHIFT DIRECTION (203) | | SHIFT AMOUNT (204) |
|---|---|---|---|---|---|
| | X | Y | X | Y | |
| ADDITION | NOR | NOR | R | R | $|X_e - Y_e|$ |
| | NOR | DEN | R | N | $|X_e - 0|$ |
| | DEN | NOR | N | R | $|X_e - 0|$ |
| | DEN | DEN | N | N | $|0 - 0|$ |
| SUBTRACTION | NOR | NOR | N | N | $|X_e - Y_e|$ |
| | NOR | DEN | N | N | $|X_e - 0|$ |
| | DEN | NOR | L | N | $|X_e - 0|$ |
| | DEN | DEN | N | N | $|0 - 0|$ |

FIG. 9

FLOATING POINT ADDITION-SUBTRACTION APPARATUS

BACKGROUND OF THE INVENTION

The present invention relates to a semiconductor integrated circuit apparatus and more particularly to a floating point adder-subtracter circuit pursuant to the IEEE (Institute of Electrical and Electronics Engineers) standard.

Pursuant to the IEEE 754 standard, a normalized number and a non-normalized number are defined as indicated by formula (1) in connection with data of 32-bit floating point form:

$$\text{normalized number } (-1)^S\, 2^{E-127}(1.F)$$

$$\text{non-normalized number } (-1)^S\, 2^{0-126}(0.F) \qquad (1)$$

where S is a sign value, E is an exponent value before being biased and F is a mantissa value following or below the point, the E being a number larger than 1. The S, E and F are represented by one bit, 8 bits and 23 bits, respectively. It will be appreciated from formula (1) that the exponent value of the non-normalized number is 0 and the bias value of exponent value for the normalized number and that for the non-normalized number are different from each other by 1.

Figure 3:
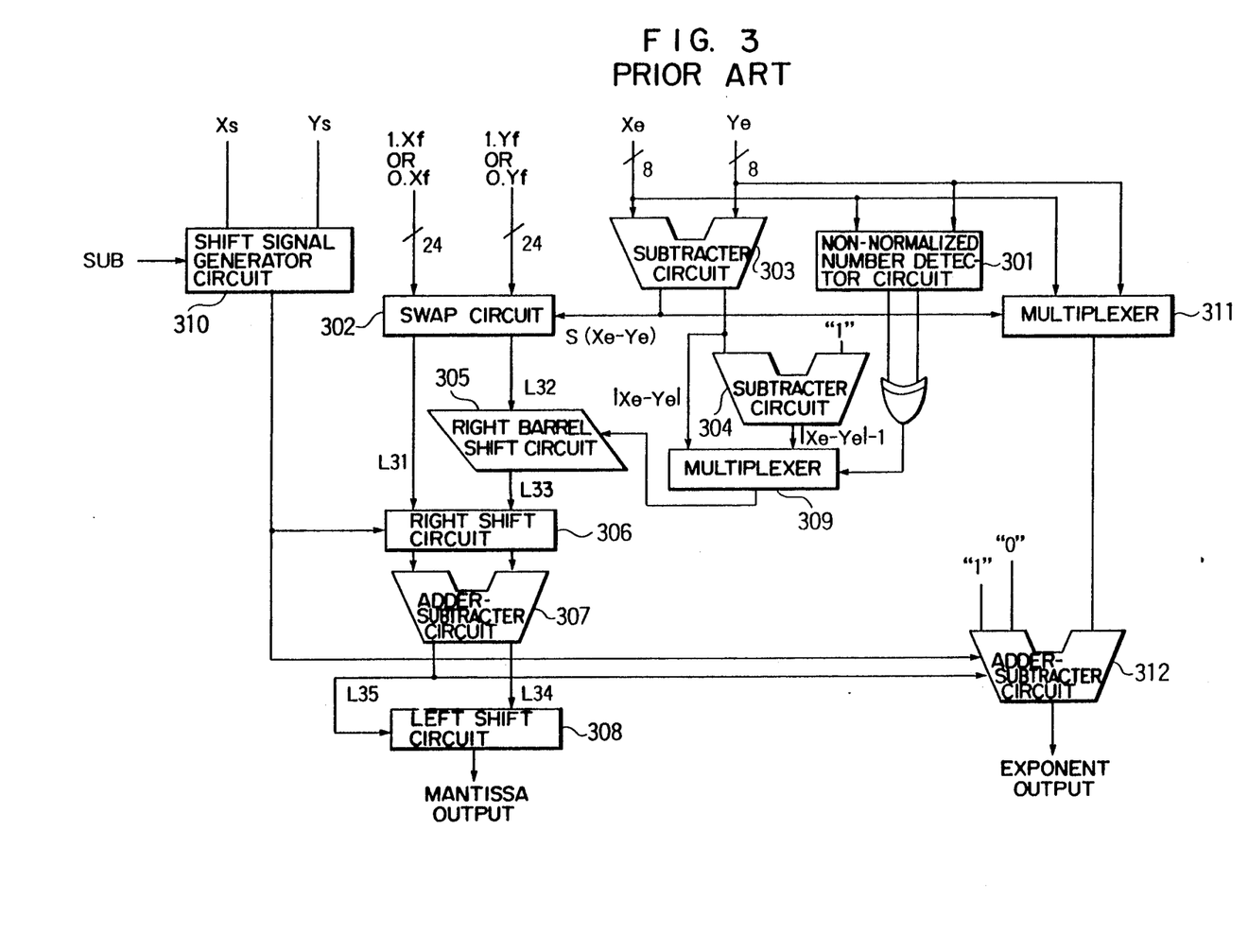
FIG. 3 is a block diagram of a prior art floating point addition-subtraction apparatus.

FIG. 3 is a block diagram of a prior art floating point addition-subtraction apparatus. Two operands to be inputted are designated by X and Y, the operand X having a sign part Xs, an exponent part Xe and a mantissa part Xf and the operand Y having a sign part Ys, an exponent part Ye and a mantissa part Yf. A non-normalized number detector circuit 301 receives operand exponent parts (Xe, Ye) to carry out detection as to whether the individual operands are of non-normalized number. A swap circuit 302 is applied with operand mantissa parts (1.Xf or 0.Xf; 1.Yf or 0.Yf) and operable to deliver output signals (data either without or by swapping the inputted operand mantissa parts. A subtracter circuit 303 performs subtraction of the operand exponent parts (Xe, Ye) to deliver an absolute value ($|Xe-Ye|$) and a sign (S(Xe-Ye)). A subtracter 304 subtracts 1 (one) from the absolute value ($|Xe-Ye|$). A right barrel shift circuit 305 is operable to shift an input value supplied from a data line L32, to the right by a desired number of bits the maximum of which is 24 bits. A right shift circuit 306 responds to a signal (indicative of addition) from a shift signal generator circuit 310 to deliver output signals either by right shifting by one digit or without shifting an input value from a data line L31 and an output value (on a data line L33) of the right barrel shift circuit 305.

An adder-subtracter circuit 307 adds or subtracts output values of the right shift circuit 306 to perform a round off processing. A left shift circuit 308 is operable to deliver an output signal either by left shifting by one digit or without shifting an output value (on a data line L34) of the adder-subtracter circuit 307. Multiplexers 309 and 311 are each a 2-input 1-output selector. Responsive to sign values (Xs, Ys) of the two input operands and a subtraction execution signal sub, the shift signal generator circuit 310 delivers a signal purporting that execution operation is addition. An adder-subtracter circuit 312 responds to the signal delivered out of the shift signal generator circuit 310 to determine whether addition or subtraction is to be executed. If addition is to be executed, the circuit 312 executes in parallel addition of an exponent value delivered out of the multiplexer 311 and "0" and addition of the exponent value and "1" and thereafter responds to a signal (on L35) delivered out of the adder-subtracter circuit 307 so as to select one of the addition results.

The operation of the prior art shown in FIG. 3 will now be described. The two input operand exponent parts (Xe, Ye) are inputted to the subtracter circuit 303, non-normalized number detector circuit 301 and multiplexer 311. At the same time, the operand mantissa parts (1.Xf or 0.Xf; 1.Yf or 0.Yf) are inputted to the swap circuit 302. Firstly, the subtracter circuit 303 calculates a shift amount $|Xe-Ye|$ of the operand mantissa parts which is necessary for making the exponent values equal and a sign S(Xe-Ye). When the two operands are of normalized numbers or of non-normalized numbers, the bias values in the exponent parts are the same for the two operands as shown in formula (1) ($-127$ for normalized number and $-126$ for non-normalized number) and therefore the shift amount applied to the right barrel shift circuit 305 is $|Xe-Ye|$. This shift amount is calculated in the subtracter circuit 303. However, when one of the two operands is of normalized number and the other is of non-normalized number, the bias values in the exponent parts are different by one for the normalized and non-normalized numbers as shown in formula (1) and therefore the shift amount of operand mantissa parts for making the exponent parts equal must be $|Xe-Ye|-1$. In other words, the output value of the subtracter circuit 303 has to be corrected. For example, given that the operand X is a normalized number and the operand Y is a non-normalized number, they are indicated by equation (2):

$$X=(-1)^{Xs}\, 1.Xf * 2^{Xe-127}$$

$$Y=(-1)^{Ys}\, 0.Yf * 2^{0-126} \qquad (2)$$

At that time, the shift amount of the mantissa part of the operand Y calculated by means of the subtracter 303 measures "$|Xe-0|$". However, the bias values of the exponent parts of the operands X and Y are "$-127$" and "$-126$" which differ from each other by one. Accordingly, even when the mantissa part "0.Yf" of operand Y is right shifted by "$|Xe-0|$" to add "$|Xe-0|$" to the exponent part "$-126$", equality of the exponent parts of the operands X and Y can not be obtained. In order to make equal the exponent parts of the operands X and Y, one must further be subtracted from the aforementioned right shift amount $|Xe-0|$ and the mantissa part must be right shifted by the resulting value. The above description has been given by way of addition but the same is true for subtraction of the two operands. Thus, the subtracter circuit 304 corrects the shift amount of operand mantissa parts used to make equal the exponent values in executing the addition-subtraction of normalized and non-normalized numbers.

Concurrently with the execution of subtraction of the exponent parts by the subtracter circuit 303, the non-normalized number detector circuit 301 performs detection as to whether the operands X and Y are non-normalized numbers or not. When the exponent parts of the operands X and Y are zero, they are non-normalized numbers. If one of the two operands is of non-normalized number, the multiplexer 309 selects the output signal ($|Xe-Ye|-1$) from the subtracter circuit 304. If the operands are both normalized numbers or non-normalized numbers, the multiplexer 309 selects the output signal ($|Xe-Ye|$) from the subtracter circuit 303, thereby determining the shift amount to be inputted to the right barrel shift circuit 305.

The multiplexer 311 responds to the sign $S(Xe-Ye)$ of the exponent subtraction value delivered out of the subtracter circuit 303 so as to select and deliver larger one of the Xe and Ye. The larger exponent value is a candidate for an exponent value as a result of the addition-subtraction.

The operand mantissa parts (1.Xf or 0.Xf; 1.Yf or 0.Yf) will now be described. In accordance with the sign $S(Xe-Ye)$ calculated by the subtracter circuit 303, the swap circuit 302 performs swapping of the operand mantissa parts as will be described below. When $Xe-Ye$ is positive or zero ($S(Xe-Ye) >$ or $=0$), the X operand mantissa parts (1.Xf or 0.Xf) is delivered to the data line L31 with the Y operand mantissa parts (1.Yf or 0.Yf) delivered to the data line L32. When negative ($S(Xe-Ye) <0$), the input values are swapped and delivered. Then, an output signal delivered from the swap circuit 302 to the data lien L31 is applied directly to the right shift circuit 306 and an output signal delivered to the data line L32 is applied directly to the right barrel shift circuit 305.

In the above operation, problems are encountered. A delay in data transmission will be considered between the timing for inputting the two operands and the phase of processing in the right barrel shift circuit 305. The longest path having relation to the operand mantissa parts (1.Xf or 0.Xf; 1.Yf or 0.Yf) reacting the right barrel shift circuit 305 is a path in which the sign ($S(Xe-Ye)$) of difference between the exponent values is determined by the subtracter circuit 303 to control the swap circuit 302 such that an operand mantissa part data piece associated with smaller one of the exponent values is inputted to the right barrel shift circuit 305.

Further, the longest path having relation to data of the shift amount reaching the right barrel shift circuit 305 is a path in which $|Xe-Ye|-1$ is calculated using the subtracter circuits 303 and 304 and this value is inputted to the right barrel shift circuit 305 through the multiplexer 309. Obviously, the number of delay stages is larger in the latter path for calculation of the shift amount than in the former path because the data passes through the two subtracter circuits in the latter path. Thus, in the prior art floating point addition-subtraction apparatus, the two subtracter circuits are used to calculate the shift amount for digit matching and therefore the operation time is increased, with the result that the overall circuit of the apparatus is complicated and increased in size. With the circuit scale increased, power consumption increases disadvantageously.

The operational description of the prior art will now continue. The right shift circuit 306 responds to the shift signal (indicative of addition) from the shift signal generator circuit 310 to shift data on the data lines L31 and L33 by one digit to the right. The data on the data lines L31 and L33 suffer from a round-off position shift after execution of addition or subtraction of the data by means of the adder-subtracter circuit 307, and the right shift circuit 306 serves as a circuit for correcting the round-off position shift. The operation of the right shift circuit 306 will be described below.

During execution of addition and subtraction, there exist three patterns in total:

normalized number±normalized number (3-1)

normalized number±non-normalized number (3-2)

non-normalized number±non-normalized number (3-3).

The execution of the above three patterns without the use of the right shift circuit 306 will be described below.

When addition is executed in patterns (3-1), (3-2) and (3-3), the results before subjected to the round off processing by the adder-subtracter circuit 307 are as follows. In the case of pattern (3-1) or (3-2), the results before the round off processing take the state as indicated by (4-1) in which the uppermost "1" of the mantissa part is at the second upper digit above the point or the state as indicated by (4-2) in which the uppermost "1" of the mantissa part is at the first upper digit above the point. In the case of pattern (3-3), the results before the round off processing take the state as indicated by (4-3) or the state as indicated by (4-4).

$$1*.** \ldots  \times 2^{Xe-127} \quad (4\text{-}1)$$

$$1.** \ldots  \times 2^{Xe-127} \quad (4\text{-}2)$$

$$1.** \ldots  \times 2^{0-126} \quad (4\text{-}3)$$

$$0.** \ldots  \times 2^{0-126} \quad (4\text{-}4)$$

When subtraction is executed in patterns (3-1), (3-2) and (3-3), the results before subjected to the round off processing are as follows. In the case of pattern (3-1) or (3-2), three kinds of results are obtained which are represented by the state having "1" at the first upper digit above the point as indicated by (5-1), the state having "1" at the first lower digit below the point as indicated by (5-2) and the state having "1" initially at the second or more lower digit below the point. In the case of (3-3), the results are always of non-normalized number as indicated by (5-4).

$$1.** \ldots  \times 2^{Xe-127} \quad (5\text{-}1)$$

$$0.1* \ldots  \times 2^{Xe-127} \quad (5\text{-}2)$$

$$0.0* \ldots  \times 2^{Xe-127} \quad (5\text{-}3)$$

$$0.** \ldots  \times 2^{0-126} \quad (5\text{-}4)$$

As will be understood from the foregoing one digit shift of the position of the uppermost numerical value "1" occurs between addition and subtraction when the results of addition and subtraction are of normalized number. This signifies that in rounding the results into a significant digit number, the position of round off of the addition results differs from the position of round off of the subtraction results. Thus, separate round off processing circuits have to be provided for addition and subtraction, resulting in an increase in the amount of hardware. Therefore, it is obviously profitable that the round off carry positions in addition and subtraction are made to be coincident with each other to permit the use of only one round off circuit. To this end one of the addition result and subtraction result is required to be digit matched to the other. In the prior art, the shift signal generator circuit 310 decides the kind of operation and in the case of addition, the right shift circuit 306 shifts the input operand by one bit to the right so that the round off position of the addition results may be coincident or aligned with the round off position of the subtraction results. In this way the addition results before round off processing can be changed from formula (4) to formula (6) to ensure that before the round off processing, the round off position of the addition results can be coincident with the round off position of the subtraction results.

$$1.** ...  \times 2^{Xe-127+1} \qquad (6\text{-}1)$$

$$0.1* ...  \times 2^{Xe-127+1} \qquad (6\text{-}2)$$

$$0.1* ...  \times 2^{0-126+1} \qquad (6\text{-}3)$$

$$0.0* ...  \times 2^{0-126+1} \qquad (6\text{-}4)$$

At that time, the addition operand is right shifted and consequently the exponent value is apparently increased by "+1". The increase in exponent value is corrected as will be described later. In this manner, the right shift circuit 306 shifts the input operand by one digit to the right in the case of addition to fill the role of making the round off position coincident with that in the case of subtraction.

Data delivered out of the right shift circuit 306 is applied to the adder-subtracter circuit 307 where it is subjected to addition-subtraction and subsequent rounding, and the results are delivered to the data line L34. Delivered to the data line L35 is a value at the first upper digit above the point of the addition-subtraction results.

Thereafter, the left shift circuit 308 and the adder-subtracter circuit 312 are used to execute the normalization processing. During the normalization processing, the correction of the exponent value obtained in the case of addition is executed.

Delivered to the data line L34 are operation results as indicated in the mantissa parts in formulas (5) and (6). Strictly, formula (5) and (6) show values obtained before the mantissa part is subjected to rounding but since any of the data formats indicated in these equations will be conserved after the round off processing, those values will be used. The normalization processing will now be described in connection with addition and subtraction.

In the case of addition, when "1" is at the first upper digit above the point (data line L35=1) as indicated by (6-1), the left shift circuit 308 delivers data (mantissa value) on data line L34 as it is. As regards the exponent value, on the other hand, the adder-subtracter circuit 312 executes Xe+1 and delivers it. This ensures that the bias value of exponent value can be "−127" and the mantissa value can be delivered in a format of normalized number of "1.***". Then, when "0" is at the first upper digit above the point (data line L35=0) as indicated by (6-2), (6-3) and (6-4), the left shift circuit 308 delivers an output signal by shifting data (mantissa value) on data line L34 by one digit to the left. As regards the exponent value, on the other hand, the adder-subtracter circuit 312 executes Xe+0 and delivers it. In this manner, the normalization processing is executed for (6-2), and data of (6-4) is permitted to be delivered in the form of a non-normalized number. Data for (6-3) is subjected to normalization during the subsequent cycle by using different hardware.

In the case of subtraction, when "1" is at the first upper digit above the point (data line L35=1) as indicated by (5-1), the left shift circuit 308 delivers an output signal without shifting data (mantissa value) on data line L34. On the other hand, the adder-subtracter circuit 312 executes subtraction Xe−0 and delivers it as an exponent value, thereby realizing the normalization processing. When "0" is at the first upper digit above the point (data line L35=0) as indicated by (5-2), (5-3) and (5-4), the left shift circuit 308 shifts data (mantissa value) on data line L34 by one digit to the left. On the other hand, the adder-subtracter circuit 312 executes subtraction Xe−1. In this manner, the normalization processing is executed for (5-2). Data for (5-3) or data for (5-4) is subjected to normalization or non-normalization during the subsequent cycle by using different hardware.

As is clear from the foregoing, the right shift circuit 306 needed for coincidence of the round off positions in addition and subtraction is inserted in a critical path as viewed from the whole floating point addition-subtraction apparatus. In other words, disadvantageously, the provision of the right shift circuit 306 further retards the operation speeds of the floating point adder-subtracter.

SUMMARY OF THE INVENTION

In the prior art floating point adder-subtracter, two subtracter circuits for digit matching are needed, causing the operation speed to be retarded, the circuit to be complicated and the circuit scale to be increased. Further, in order to ensure coincidence of round off positions in addition and subtraction, the right shift circuit must be inserted in the critical path, causing the operation speed to be further retarded.

In view of the above problems, the present invention has for its object to provide a floating point addition-subtraction apparatus which can simplify the circuit and reduce power consumption and time required for operation by providing a right-left shift circuit preceding the right barrel shift circuit to permit the use of only one subtracter circuit adapted to calculate the shift amount for digit matching.

To accomplish the above object, according to the present invention, a floating point addition-subtraction apparatus for adding or subtracting two pieces of data to be operated having a floating point format comprised of a mantissa part operand, an exponent part operand and a sign part operand, comprises shift means for not shifting or right or left shifting by one digit the mantissa part operands before execution of addition-subtraction of the two mantissa operands, on the basis of information as to whether the two pieces of operated data are of normalized number or non-normalized number or whether the execution operation is addition or subtraction.

With the above construction, the invention can realize a floating point addition-subtraction apparatus in which the use of only one subtracter circuit for calculating the shift amount of operand mantissa parts suffices and the shift circuit for making coincident the round off positions in addition and subtraction is not inserted in the critical path.

As described above, according to the invention, in executing floating point addition-subtraction pursuant to the IEEE standard, the shift circuit is provided which does not shift or shifts the operand mantissa parts by one digit to the right or left before an operand mantissa part associated with smaller exponent value is right shifted for digit matching of the two operands, thereby providing the floating point addition-subtraction apparatus in which the use of only one subtracter adapted to calculate the shift amount for digit matching of the two operands suffices to simplify the circuit and reduce the time required for operation.

DESCRIPTION OF THE PREFERRED EMBODIMENTS

Figure 1:
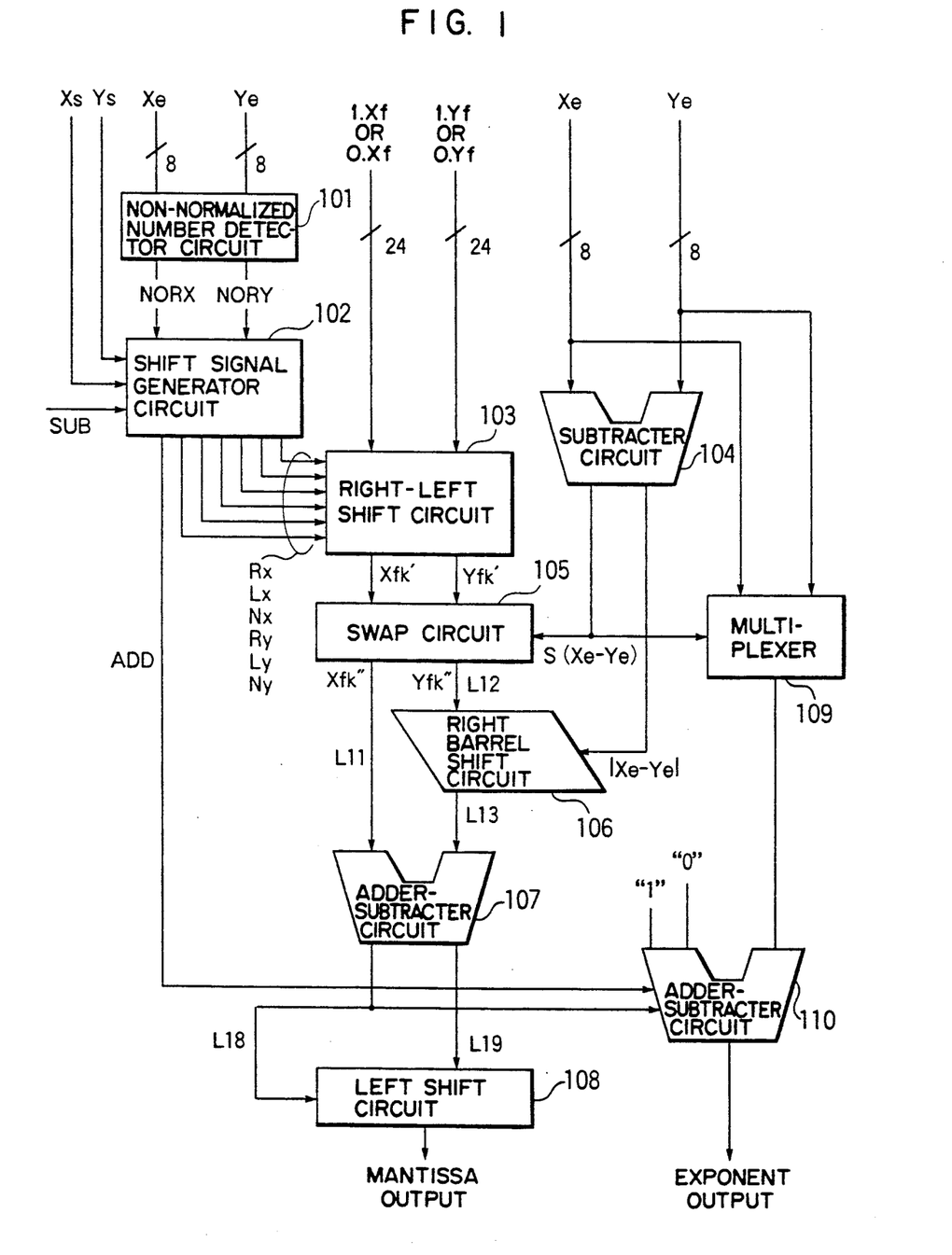
FIG. 1 is a block diagram of an embodiment of a floating point addition-subtraction apparatus according to the invention.

FIG. 1 is a schematic block diagram of a floating point adder-subtracter apparatus on which claims 1, 2 and 4 are readable.

Two input operand exponent parts (Xe, Ye) are inputted to a subtracter circuit 104 and a non-normalized number detector circuit 101. At the same time, operand mantissa parts (1.Xf or 0.Xf; 1.Yf or 0.Yf) are inputted to a right-left shift circuit 103. The subtracter circuit 104 carries out subtraction of operand exponent values Xe and Ye to calculate an absolute value |Xe−Ye| and a sign value S(Xe−Ye). The non-normalized number detector circuit 101 performs detection as to whether the individual input operands are normalized numbers to deliver signals (NORX, NORY) purporting that the two operands are normalized numbers.

The two detection signals (NORX, NORY) delivered out of the non-normalized number detector circuit 101 are inputted to a shift signal generator circuit 102 where they cooperate with sign values (Xs, Ys) of the operands and a subtraction execution signal sub to prepare control signals (Rx, Ry, Lx, Ly, Nx, Ny) for shifting the two input operand mantissa values by one digit to the right or left. Responsive to the control signals (Rx, Ry, Lx, Ly, Nx, Ny) from the shift signal generator circuit 102, the right-left shift circuit 103 shifts the two input operand mantissa values to the right or left. Input data (Xfk′, Yfk′) from the output of the right left shift circuit 103 are swapped by means of a swap circuit 105 in accordance with the sign S(Xe−Ye) delivered out of the subtracter circuit 104 and the swap circuit 105 delivers output signals (Xfk″, Yfk″) to a right barrel shift circuit 106 and an adder-subtracter circuit 107.

The right barrel shift circuit 106 shifts the input value to the right by absolute value |Xe−Ye| of the difference between the operand exponent values which is delivered out of the subtracter circuit 104. Then, the adder-subtracter circuit 107 executes addition-subtraction and round off. Thereafter, when "1" does not exist at the first upper digit above the point (data line L18) of an output value of the adder-subtracter circuit 107, a left shift circuit 108 shifts the output value of the adder-subtracter circuit 107 by one digit to the left.

As regards the exponent parts, a multiplexer 109 responds to the sign value S(Xe−Ye) delivered out of the subtracter circuit 104 to select a large one of the exponent values. The output signal of the multiplexer 109 is inputted to an adder-subtracter 110 so that the operation (addition or subtraction) of the adder-subtracter circuit 110 may be determined in accordance with an execution operation signal (Add) delivered out of the shift signal generator circuit 102. For example, when the operation of the adder-subtracter circuit 110 is determined to be addition, the result of addition of "1" to the exponent value and the result of addition of "0" to the exponent value are prepared in parallel. One of the addition results is selected by a signal on data line L18 delivered out of the adder-subtracter circuit 107 and delivered. The signal on the data line L18 is indicative of the fact that the first upper digit above the point of the output value of the adder-subtracter circuit 107 is "1".

The present invention will now be outlined. As has been explained in relation to the prior art, the round off positions in addition and subtraction of the mantissa parts shift from each other by one digit. In accordance with the present invention, the right-left shift circuit 103 is controlled in such a way that the addition results are made to be conformable to the subtraction results to make the round off positions in addition and subtraction coincident with each other and that the amount of shift of the mantissa part operand associated with smaller exponent value, which amount is needed for digit matching, can be determined with a single subtracter circuit. The way of controlling the right-left shift circuit 103 and the way of obtaining the mantissa shift amount with the single subtracter circuit will now be described.

For simplicity of explanation, the case will be described herein where floating point data of 32 bits pursuant to the IEEE 754 standard is used. Firstly, the three patterns (3-1), (3-2) and (3-3) will be described in connection with addition.

Addition of normalized numbers of (3-1) pattern will be expressed by formula (7) where * is 0 or 1 and Xe≧ stands. This condition is valid for all formulas to be described hereinafter. Since both the operands are of normalized number, Xe and Ye are not zero.

$$1.**\_- \times 2^{Xe-127} \qquad (7)$$
$$\underline{\pm) 1.**\_- \times 2^{Ye-127}}$$

At that time, two types of addition results as indicated by formulas (8-1) and (8-2) can be obtained.

$$1*.**\_- \times 2^{Xe-127} \qquad (8\text{-}1)$$
$$1.**\_- \times 2^{Xe-127}. \qquad (8\text{-}2)$$

In the case of addition of normalized numbers. The uppermost "1" exits at the second upper digit and the first upper digit above the point. Accordingly, in order to make coincident the round off position in the addition results and that in the subtraction results, the right-left shift circuit 103 shifts in advance the input operand mantissa parts by one digit to the right so that the exponent bias value may apparently take −126. At that time, because of the equality of the bias values, the right shift amount of mantissa parts for execution of digit matching of the exponent parts can remain to be $|Xe-Ye|$, which is calculated by the subtracter circuit 104.

Addition of normalized number and non-normalized number of (3-2) pattern will now be described. This addition is formulated by formula (9).

$$\begin{array}{r} 1.**\_ \times 2^{Xe-127} \\ +) \, 0.**\_ \times 2^{0-126} \end{array} \qquad (9)$$

At that time, two types of addition results can be obtained as indicated by formula (10-1) and (10-2):

$$1*.**\_\_\_ \times 2^{Xe\text{-}127} \qquad (10\text{-}1)$$

$$1.**\_\_\_ \times 2^{Xe\text{-}127} \qquad (10\text{-}2)$$

Thus, as in the case of formulas (8-1) and (8-2), the right-left one-digit shift circuit 103 is required to shift the input operand mantissa parts in order to ensure coincidence of the round off positions in addition and subtraction. Here, only the operand mantissa input value (1.Xf) of the normalized number is right shifted by one digit. Accordingly, formula (9) is converted to formula (11).

$$\begin{array}{r} 0.1**\_ \times 2^{Xe-127+1} \\ +) \, 0.**\_ \times 2^{0-126} \end{array} \qquad (11)$$

Formula (11) ensures that the position at which the uppermost "1" exists in the addition results coincides with the position at which the uppermost "1" exists in the subtraction results. At the same time, since the exponent bias values of the normalized and non-normalized numbers apparently take "−126", the right shift amount of the mantissa part operand necessary for digit matching measuring $|Xe-0|$ suffices. This shift amount is calculated by the subtracter circuit 104.

Addition of non-normalized numbers of (3-3) pattern will be described. This addition is formulated by formula (12).

$$\begin{array}{r} 0.**\_ \times 2^{0-126} \\ +) \, 0.**\_ \times 2^{0-126} \end{array} \qquad (12)$$

At that time, a non-normalized number or a normalized number as indicated by formula (13) is obtained as the addition results.

$$1.**\_\_\_ \times 2^{1\text{-}127} \qquad (13).$$

At that time, the coincidence of the round off positions in addition and subtraction stands without shifting the input operand mantissa part by means of the right-left shift circuit 103. The exponent bias values are the same measuring "−126" and therefore the mantissa part shift amount for digit matching measuring $|0-0|$ suffices, which shift amount is calculated by the subtracter circuit 104.

As described above, in executing addition, the right-left shift circuit 103 shifts the mantissa part operand of normalized number by one digit to the right in order that the coincidence of the round off positions in the addition and subtraction results can be attained and the bias value of the exponent part can apparently be set to "−126". This ensures that the shift amount required for right shifting the mantissa part operand associated with smaller exponent value in the succeeding digit matching processing can be determined by merely using an absolute value of a difference between the two exponent part operands.

The following description will be given by way of subtraction.

Firstly, subtraction of normalized numbers of (3-1) pattern will be described. This subtraction is formulated by formula (14).

$$\begin{array}{r} 1.**\_ \times 2^{Xe-127} \\ -) \, 1.**\_ \times 2^{Ye-127} \end{array} \qquad (14)$$

At that time, the subtraction results can be represented by either two types of results as indicated by formulas (15-1) and (15-2) or a non-normalized number.

$$1.**\_\_\_ \times 2^{Xe\text{-}127} \qquad (15\text{-}1)$$

$$0.1*\_\_\_ \times 2^{Xe\text{-}127} \qquad (15\text{-}2).$$

In this case, the right-left shift circuit 103 is not required to shift the two input operands and because of equality of the exponent bias values, the shift amount for digit matching of the exponent parts can be $|Xe-Ye|$, which is calculated by the subtracter circuit 104.

Subtraction of normalized number and non-normalized number of (3-2) pattern will now be described. This subtraction is formulated by formula (16).

$$\begin{array}{r} 1.**\_ \times 2^{Xe-127} \\ -) \, 0.**\_ \times 2^{0-126} \end{array} \qquad (16)$$

At that time, the subtraction results can be represented by either two types of results as indicated by formulas (17-1) and (17-2) or a non-normalized number.

$$1.**\_\_\_ \times 2^{Xe\text{-}127} \qquad (17\text{-}1)$$

$$0.1*\_\_\_ \times 2^{Xe\text{-}127} \qquad (17\text{-}2)$$

Since in formula (16) the bias values of the two input operands differ from each other by one, the mantissa part of the non-normalized number is shifted by one digit to the left. Then, formula (16) is converted to formula (18).

$$\begin{array}{r} 1.**\_ \times 2^{Xe-127} \\ -) \, *.****\_*0 \times 2^{0-126-1} \end{array} \qquad (18)$$

As a result of mantissa subtraction pursuant to formula (18), values as indicated by formula (17) can be obtained. Therefore, with the mantissa part of the non-normalized number shifted by one digit to the left by means of the right-left shift circuit 103, the bias values apparently take the same value (−127) and the mantissa part shift amount for digit matching can be $|Xe-0|$, which is calculated by the subtracter circuit 104.

Subtraction of non-normalized numbers of (3-3) pattern will be described. This subtraction is formulated by formula (19).

$$\begin{array}{r} 0.**\_ \times 2^{Xe-126} \\ -) \, 0.**\_ \times 2^{0-126} \end{array} \qquad (19)$$

As that time, a non-normalized number can always be obtained as the subtraction results. In this case, the right-left shift circuit 103 can be controlled in two ways. A first way is not to shift the mantissa part operand and a second way is to left shift both the mantissa part operands.

Firstly, execution based on the first method will be described. When the input operand mantissa part is not shifted by the shift circuit 103, the exponent bias values are the same measuring "−126". At that time, the mantissa shift amount for digit matching of the exponent parts can be $|0-0|$, which is calculated by the subtracter circuit 104.

Execution based on the second method is as follows. When the input operand mantissa part is left shifted by the shift circuit 103, the exponent bias values apparently take the same value measuring "−127". At that time, the mantissa shift amount for digit matching of the exponent parts measuring $|0-0|$ suffices. In this case, there results formula (20).

$$\begin{array}{r}*.****\_\_*0 \times 2^{0-126-1} \\ -)*.****\_\_*0 \times 2^{0-126-1}\end{array} \qquad (20)$$

As will be seen from formula (20), the exponent bias value apparently takes −127. Since subtraction of non-normalized numbers always results in a non-normalized number, the mantissa part of the results delivered out of the adder-subtracter circuit 107 must be shifted by one digit to the right so that the bias value of the exponent part may take −126. Thus, a one-digit right shift circuit for shifting the mantissa part by one digit to the right must be provided after the adder-subtracter circuit 107. This invites an increase in hardware and besides causes an increase in operation time. Accordingly, in the present embodiment, when the first method is employed for subtraction of the two operands being of non-normalized number, the right-left shift circuit 103 operates not to shift the mantissa operands.

In executing subtraction, the right-left shift circuit 103 is operated as described above so that the shift amount for right shifting the mantissa part operand associated with smaller exponent value in the digit matching processing may be determined by merely using an absolute value of a difference between the two exponent part operands.

Figure 2:
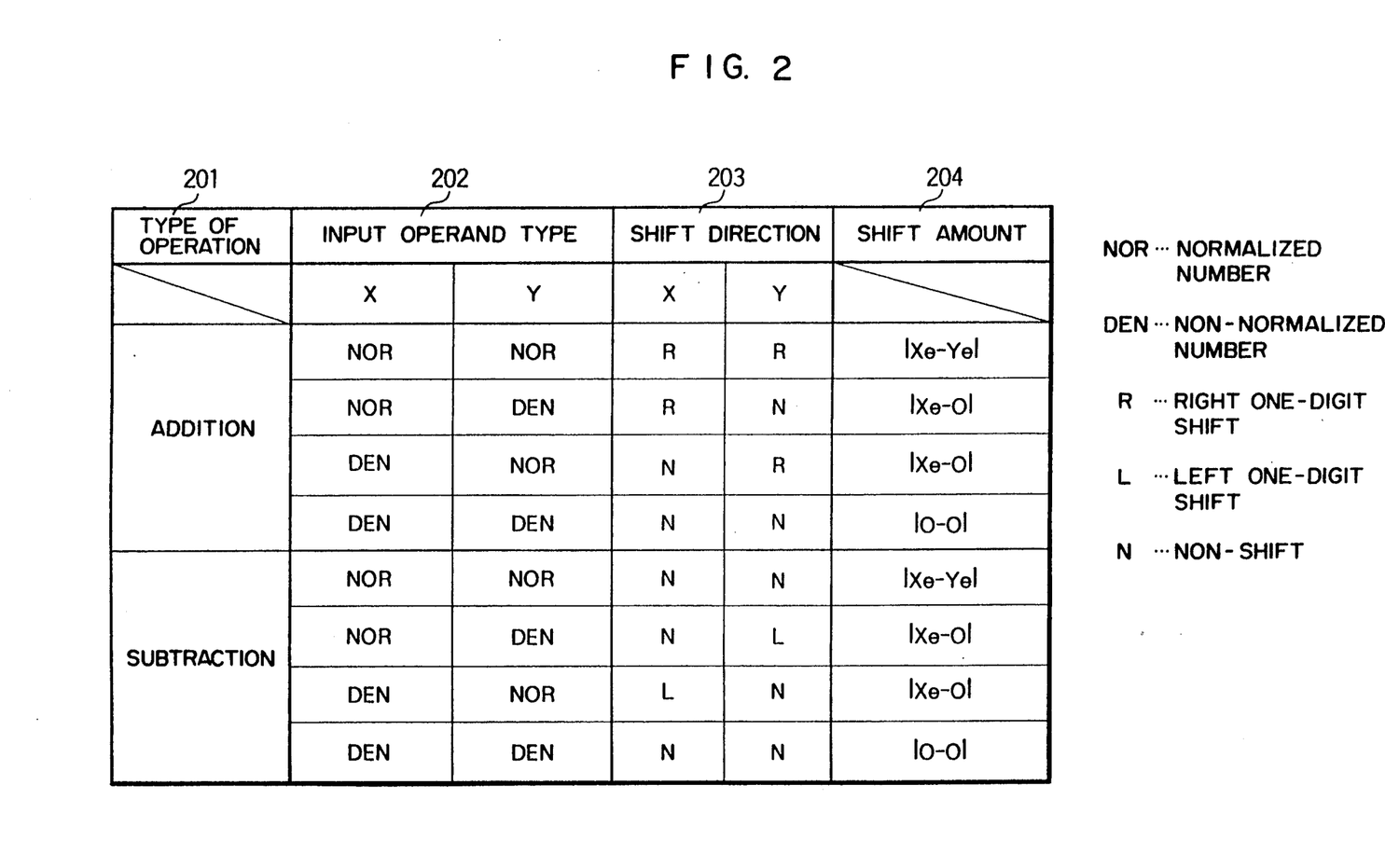
FIG. 2 is table showing how the operation of a right-left shift circuit of FIG. 1 and the shift amount delivered out of a subtracter circuit change depending on the type of operation and the type of operand.

To sum up the type of operation (addition or subtraction), the type of input operand (normalized number <NOR> or non-normalized <DEN> number), the direction of shift of the input operand mantissa part (right shift, left shift or non-shift) and the shift amount necessary for digit matching, they are listed in a table of FIG. 2. In FIG. 2, reference numeral 201 designates the type of operation which indicates that operation to be executed is either addition or subtraction. The operation type is determined by the sign (Xs, Ys) of operands and the subtraction signal sub. In particular, a formula to the effect that the execution operation is addition is a logical formula (21).

$$\overline{Xs \oplus Ys \oplus sub} \qquad (21).$$

This signal corresponds to a signal on a signal line Add shown in FIG. 1.

The input operand type 202 indicates that the two input operands (X, Y) are of either non-normalized number of normalized number. This input operand type is determined depending on whether each operand exponent value is zero or not, the determination being executed by the non-normalized number detector circuit 101. When the operand exponent value is zero, non-normalized number is determined. The shift direction 203 indicates how the right-left shift circuit 103 is operated depending on the operation type 201 and input operand type 202. Non-shift is represented by N, one-digit right shift is represented by R and one-digit left shift is represented by L. The shift direction corresponds to the signal line Rx, Ry, Lx, Ly, Nx or Ny shown in FIG. 1. The shift amount 204 indicates an amount of shift by the right barrel shift circuit 106, corresponding to $|Xe-Ye|$ delivered out of the subtracter circuit 104 shown in FIG. 1.

Figure 4:
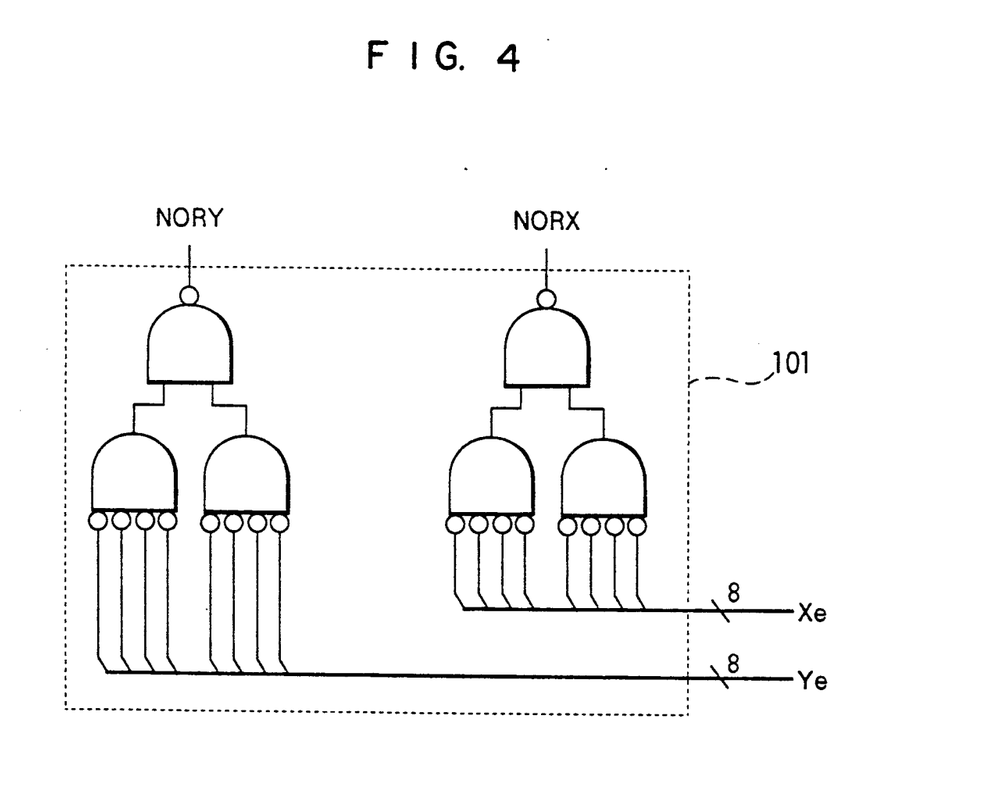
FIG. 4 is a logical circuit diagram of a non-normalized number detector circuit 101 shown in FIG. 1.

Logical circuit forms of the circuit components shown in FIG. 1 will now be described. The non-normalized number detector circuit 101 is operable to determine whether the two exponent part operands are of normalized number or non-normalized number. When the exponent values are all "0", a non-normalized number is settled. A logical circuit for this purpose is shown in FIG. 4. Two stages of gate delay circuits deliver a signal (NORX or NORY) indicative of "settlement of normalized number".

Figure 5:
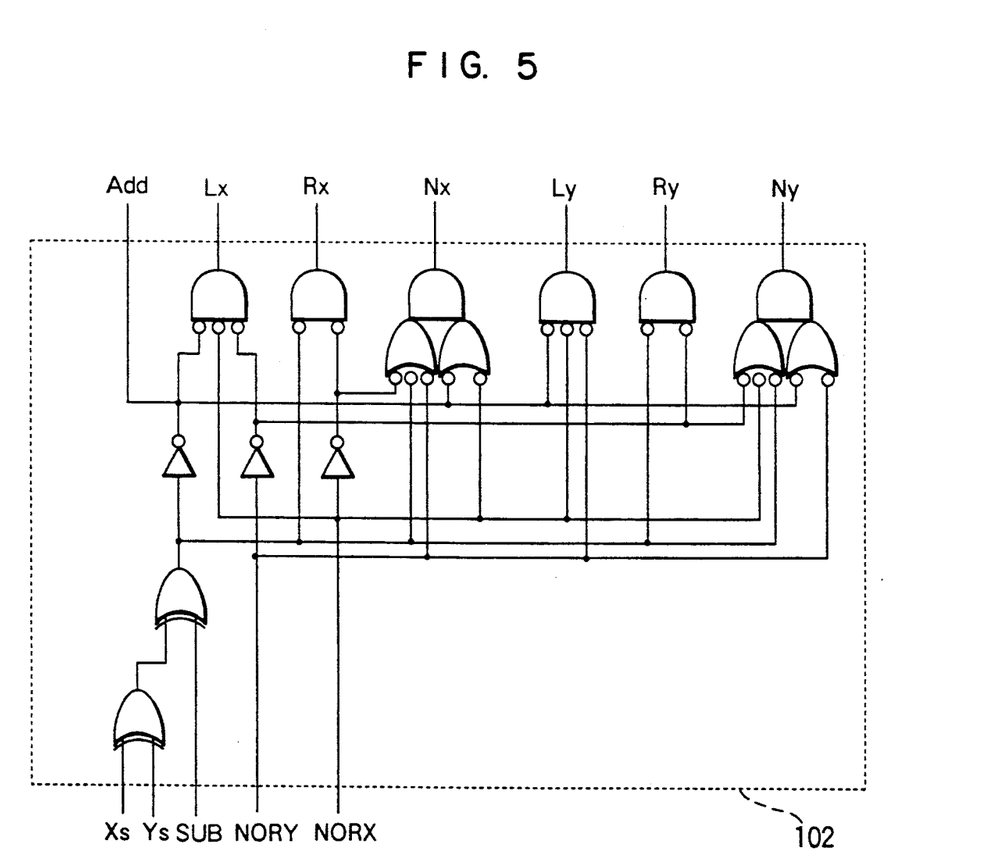
FIG. 5 is a logical circuit diagram of a shift signal generator circuit 102 shown in FIG. 1.

The shift signal generator circuit 102 is operable to generate a control signal for causing the right-left shift circuit to right one-digit shift, left one-digit shift, or not to shift the two mantissa part operands received by the circuit 103 and also operable to generate a signal (Add) to the effect that the execution operation is addition. A logical circuit for this purpose is shown in FIG. 5. This logical circuit receives sign part operands (Xs, Ys), a subtraction signal (sub) and signals (NORX, NORY) purporting that each of the X and Y operands is a normalized number and delivers signals (Lx, Ly) for left one-digit shift, signals (Rx, Ry) for right one-digit shift or signals (Nx, Ny) for non-shift. It also delivers the signal (Add) to the effect that the execution operation is addition. It will be appreciated that the shift signal generator circuit 102 receives the sign part operands and exponent part operands and delivers the control signals through four stages of gate delay circuits.

Figure 6:
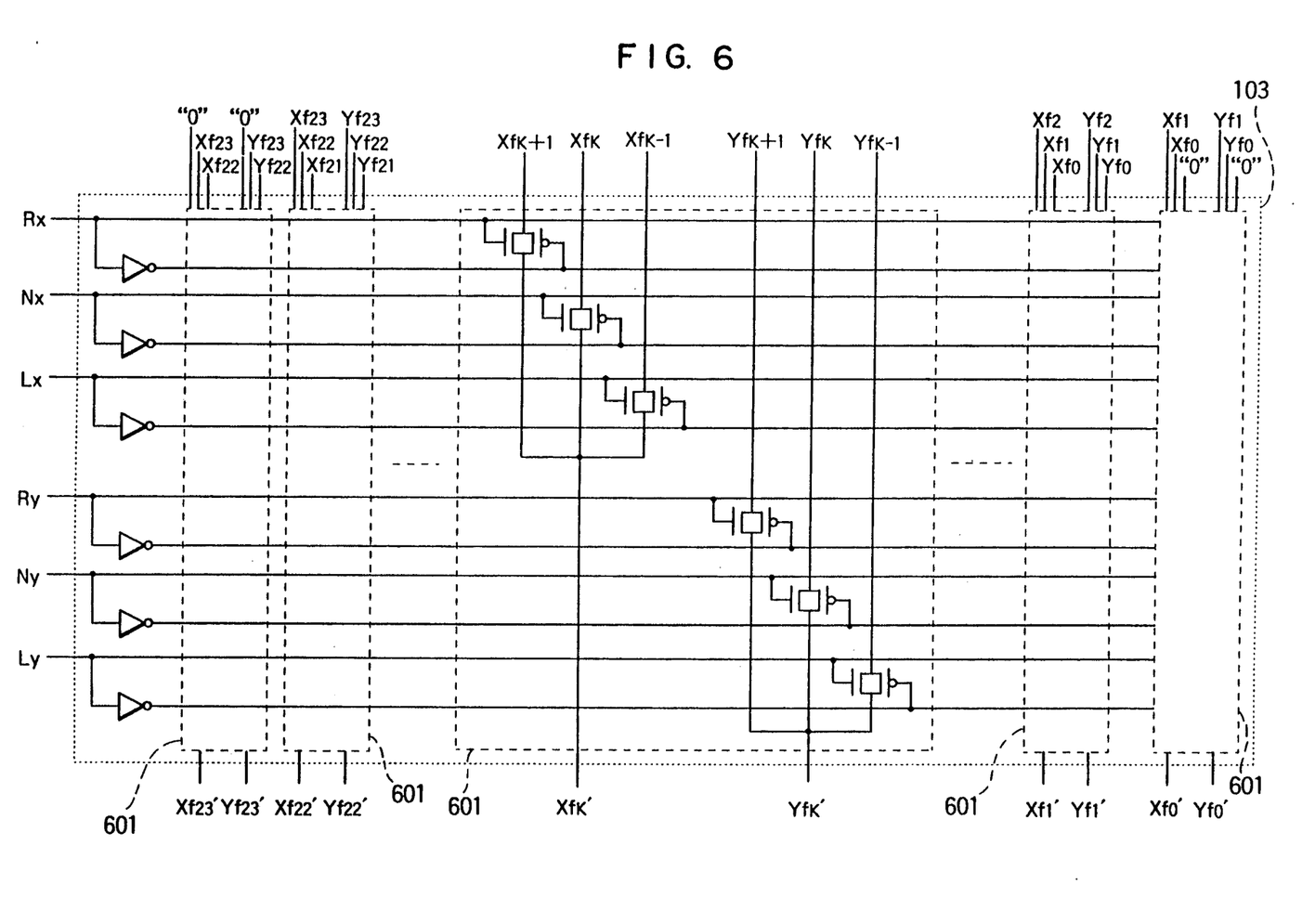
FIG. 6 is a logical circuit diagram of a right-left shift circuit 103 shown in FIG. 1.

The right-left shift circuit 103 is a block in which three operations is executed, on the basis of the control signal (Rx, Ry, Lx, Ly, Nx, Ny) delivered out of the shift signal generator circuit 102, for left one-digit shifting, right one-digit shifting or not shifting the two mantissa operands inputted to the circuit 103. An actual logical circuit to this end is shown in FIG. 6. Reference numeral 601 designates a right-left shift circuit at a desired digit (k-th digit). With the control signal Rx or Ry received, a value at the first upper digit above the point is delivered; with the control signal Nx or Ny received, an unchanged digit value is delivered; and with the control signal Lx or Ly received, a value at the first lower digit below the point is delivered. It will be appreciated that responsive to the control signal (Rx, Ry, Lx, Ly, Nx, Ny) from the shift signal generator circuit 102, the circuit 103 executes the aforementioned three shift operations through one stage of gate delay circuit.

Figure 7:
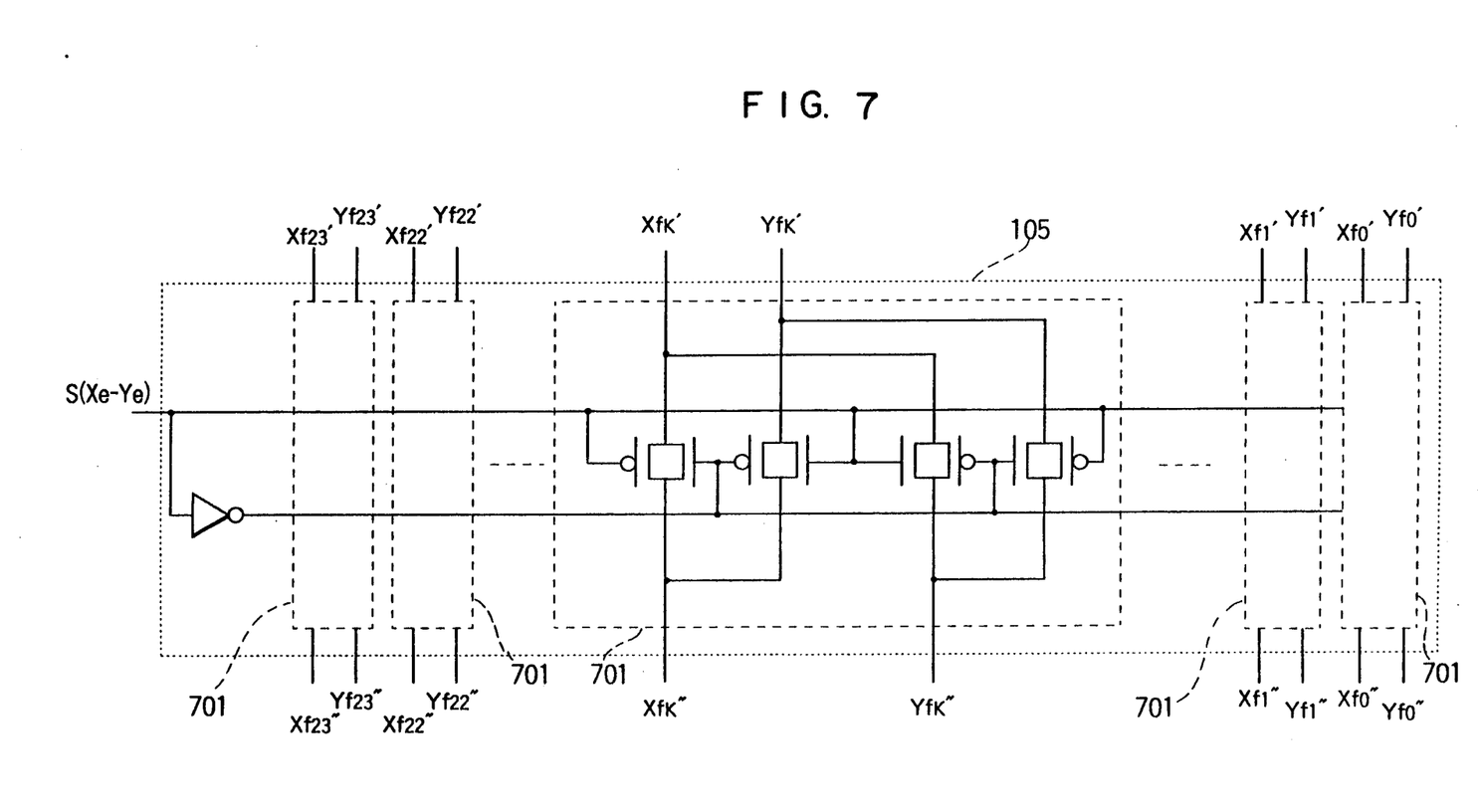
FIG. 7 is a logical circuit diagram of a swap circuit 105 shown in FIG. 1.

The swap circuit 105 responds to a sign $S(Xe-Ye)$ of a difference between exponent values delivered out of the subtracter circuit 104 to swap mantissa part operands delivered out of the right-left shift circuit 103. An actual logical circuit to this end is shown in FIG. 7. Denoted by 701 is a swap circuit at a desired digit (k-th digit). With the signal $S(Xe-Ye)$ being inputted, input data pieces are swapped and delivered.

Figure 8:
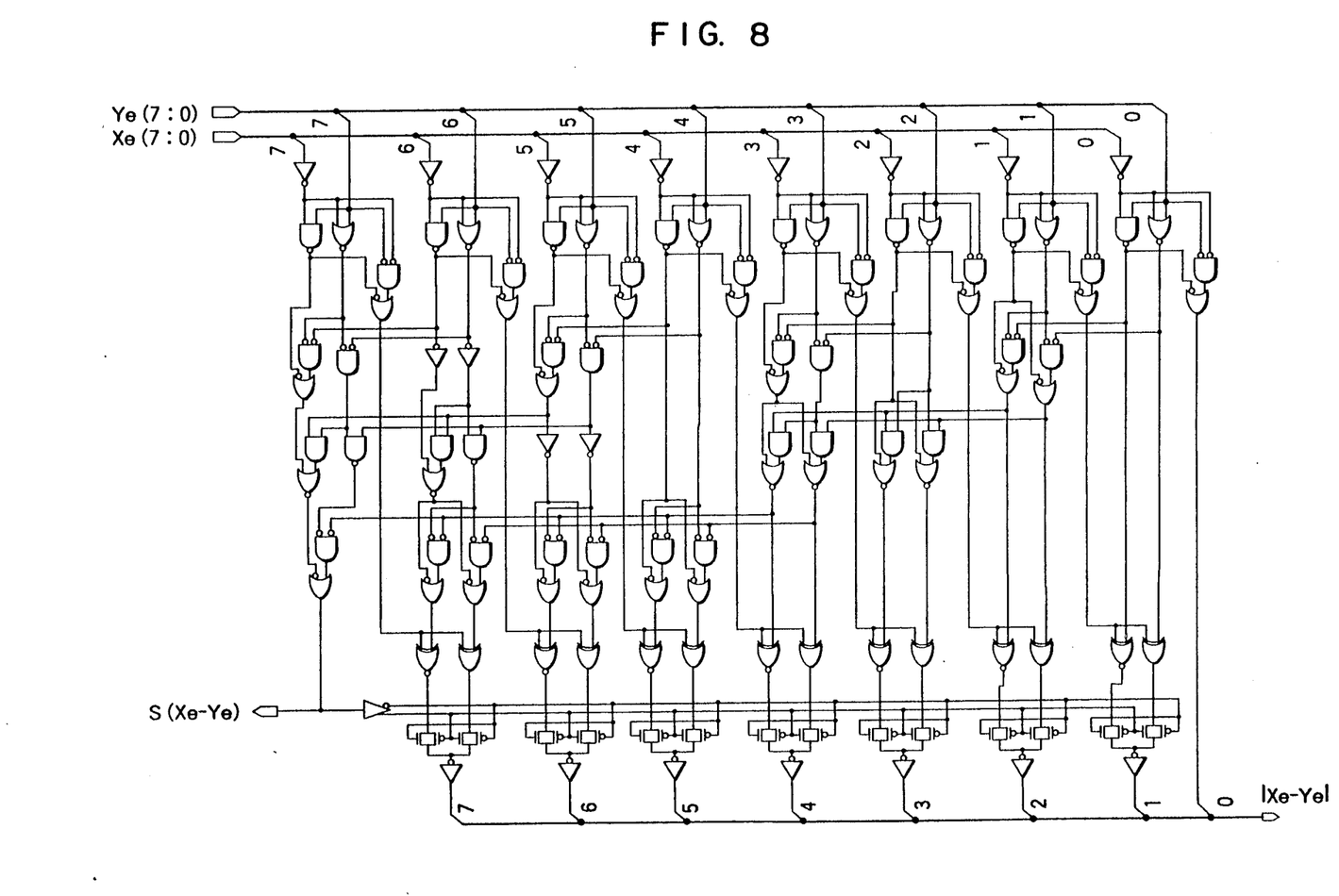
FIG. 8 is a logical circuit diagram of a subtracter circuit 104 shown in FIG. 1.

The adder-subtractor circuit 107 makes use of the technique shown in the disclosure of Japanese Patent Application Laid-Open Hei-1-240927, the subject of which was filed by U.S. application Ser. No. 327656 on Mar. 23, 1989 by the same assignee with the present application. The subtracter circuit 104 is operable to subtract the two exponent part operands so as to deliver a sign S(Xe−Ye) and an absolute value |Xe−Ye| of the difference. This circuit is described in Japanese Patent Application Laid-Open Hei-1-205328 and a subtracter circuit constructed by utilizing this circuit is shown in FIG. 8. With the exponent part operands inputted, the sign value S(Xe−Ye) is delivered through five stages of gate delay circuits and the absolute value |Xe−Ye| is delivered through seven stages of gate delay circuits.

Consider data paths preceding the swap circuit 105. One path traces the non-normalized mantissa detector circuit 101, shift signal generator circuit 102 and right-left shift circuit 103 to apply mantissa part data to the swap circuit 105 and it includes five stages of gate delay circuits as will be seen from FIGS. 4, 5 and 6. The other path traces the subtracter circuit 104 for producing the control signal S(Xe−Ye) in accordance of which the swap circuit 105 swaps the data pieces and it includes five stages of gate delay circuits as will be seen from FIG. 7. Thus, it should be understood that in connection with the paths preceding the swap circuit 105 operable to swap the input floating point data pieces, the former and latter paths include the same number of gate delay circuit stages.

As described above, by using the right-left shift circuit according to the invention, the interference coincidence of round off positions in addition and subtraction with the critical path, which interference is of prior art problem, can be prevented and to great advantage, the mantissa part shift amount for digit matching of the exponent parts can be obtained with only the single subtracter circuit, thereby reducing the operation time and the circuit scale.

The normalization of the addition-subtraction results can be executed in a similar manner to that for the prior art by using the left shift circuit 108 and adder-subtracter circuit 110.

The present embodiment has been described by way of the floating point data of 32 bits pursuant to the IEEE 754 standard but the invention can be applied more effectively to a longer operand because the time consumed in exponent part subtraction for determining the mantissa part shift amount becomes longer than the time for detecting the non-normalized number in proportion to the bit length of the data.

Figure 9:
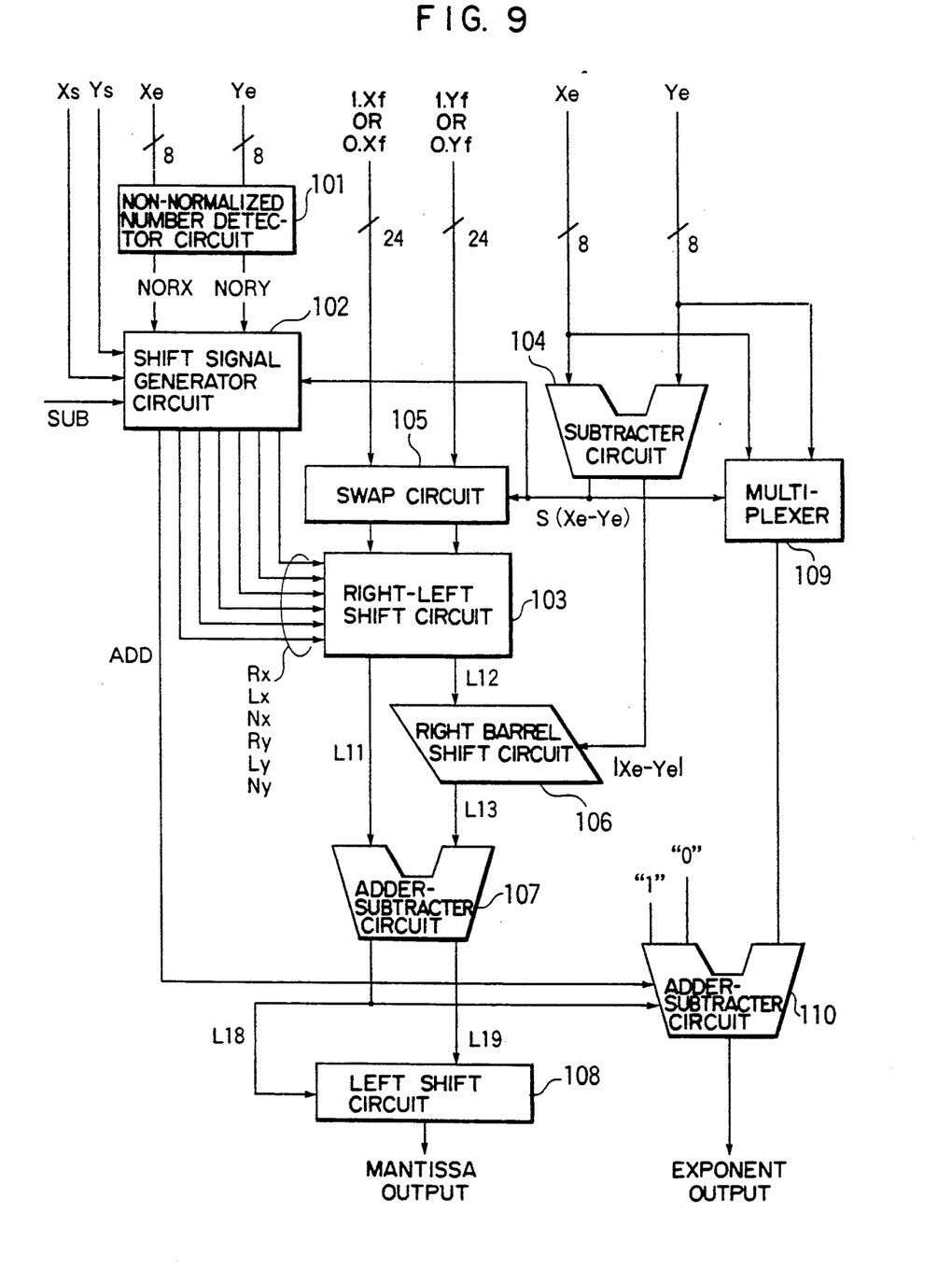
FIG. 9 is a block diagram of another embodiment of the floating point addition-subtraction apparatus according to the invention.

While in the foregoing embodiment the right-left shift circuit 103 precedes the swap circuit 105, similar effects can be attained with another embodiment shown in FIG. 9 wherein the swap circuit 105 precedes the right-left shift circuit 103. The FIG. 9 embodiment is however valid provided that the sign S(Xe−Ye) of the exponent difference can be determined by the subtracter circuit 104 far earlier than the determination of the shift signals Rx, Ry, La, Ly, Nx, and Ny.

We claim:

1. A floating point addition-subtraction apparatus for adding or subtracting two floating point number operands each including a mantissa part operand, an exponent part operand and a sign part operand, said apparatus comprising:

first means for receiving two exponent part operands and a signal indicating whether an operation to be performed is an addition or a subtraction, for performing a detection operation by detecting from the two exponent part operands whether the floating point number operands are of normalized numbers or non-normalized numbers, and for generating shift signals based upon a result of the detection operation and on the basis of said two exponent part operands and the signal indicating whether the operation is an addition or a subtraction;

second means for not shifting or right or left shifting said mantissa part operands based upon the shift signals from said first means and for delivering outputs based upon shifting or not shifting said mantissa part operands;

third means for performing a subtraction of said two exponent part operands and for outputting a signal value and an absolute value based upon a result of the subtraction;

fourth means for swapping output values of said second means based upon the sign value from said third means, and for delivering outputs based upon the swapped output values;

fifth means for right shifting an output value which has a smaller exponent part operand among values of said outputs of said fourth means, said right shifting by said fifth means being carried out by an amount corresponding to the absolute value outputted from said third means; and sixth means for performing an addition-subtraction operation by adding-subtracting to and from said output value right shifted by said fifth means an output value which has a larger exponent part operand among values of said outputs of said fourth means, and for rounding a result of the addition-subtraction operation to deliver a rounded output.

2. A floating point addition-subtraction apparatus according to claim 1, wherein when the two floating point number operands are of non-normalized numbers and the operation performed on the mantissa part operands is a subtraction, the second means does not shift the mantissa part operands.

3. A floating point addition-subtraction apparatus for adding or subtracting two floating point number operands each including a mantissa part operand, an exponent part operand and a sign part operand, said apparatus comprising:

first means for receiving two exponent part operands and a signal indicating whether an operation to be performed is an addition or a subtraction, for performing a detection operation by detecting from the two exponent part operands whether the floating point number operands are of normalized numbers or non-normalized numbers, and for generating shift signals based upon a result of the detection operation and based upon said two exponent part operands and the signal indicating whether the operation is an addition or a subtraction;

second means for performing a subtraction of said two exponent part operands and for outputting a signal value and an absolute value of a result based upon the subtraction;

third means for swapping said mantissa part operands based upon the signal value from said second means, and for delivering outputs based upon the swapped mantissa part operands;

fourth means for not shifting or right or left shifting said outputs of said third means based upon the shift signals from said first means and for delivering outputs based upon shifting or not shifting said outputs of said third means;

fifth means for right shifting an output value which has a smaller exponent part operand among values of said outputs of said fourth means, said right shifting by said fifth means being carried out by an amount corresponding to the absolute value outputted from said second means; and sixth means for performing an addition-subtraction operation by adding-subtraction to and from said output value right-shifted by said fifth means an output value which has a lager exponent part operand among values of said outputs of said fourth means, and for rounding a result of the addition-subtraction operation to deliver a rounded output.

4. A floating point addition-subtraction apparatus according to claim 3, wherein when the two floating point number operands are of non-normalized numbers and the operation performed on the mantissa part operands is a subtraction, the fourth means does not shift the mantissa part operands.

* * * * *